Nov. 1, 1966   R. N. FOSTER   3,282,504
ZONE CONTROL AIR VALVE DAMPER FOR HEATING OR COOLING SYSTEMS
Filed Nov. 12, 1964   2 Sheets-Sheet 2
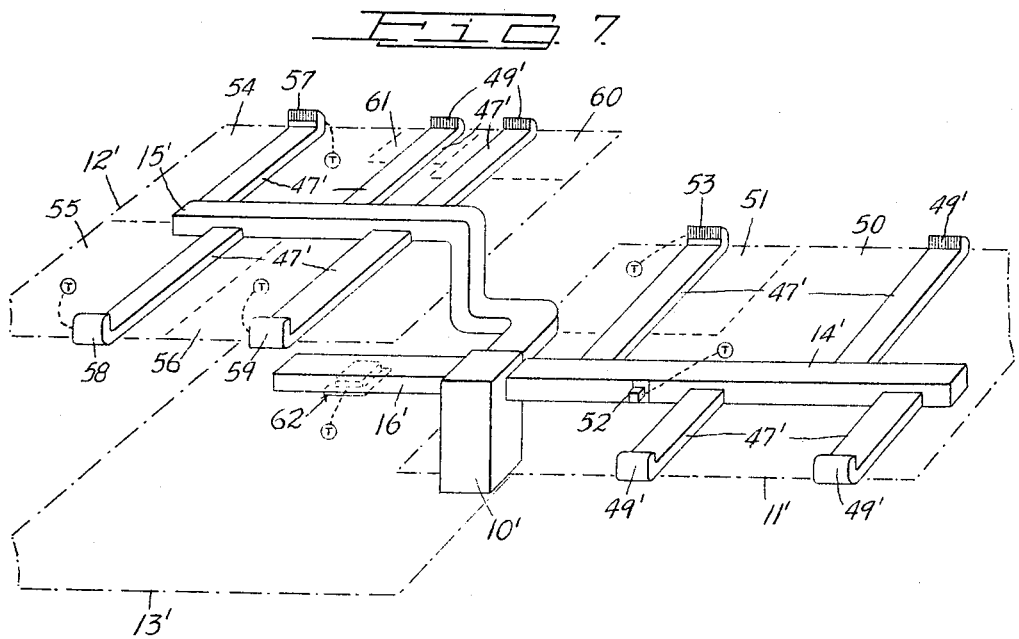
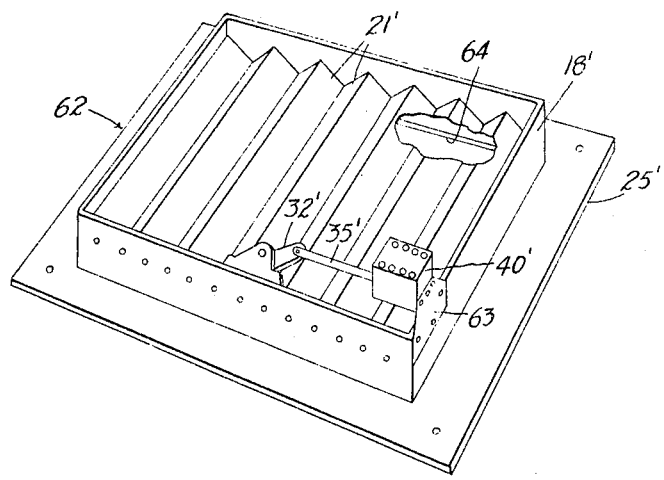
INVENTOR.
RICHARD N. FOSTER
BY
Howard P. Thompson
ATTORNEY

United States Patent Office 3,282,504
Patented Nov. 1, 1966

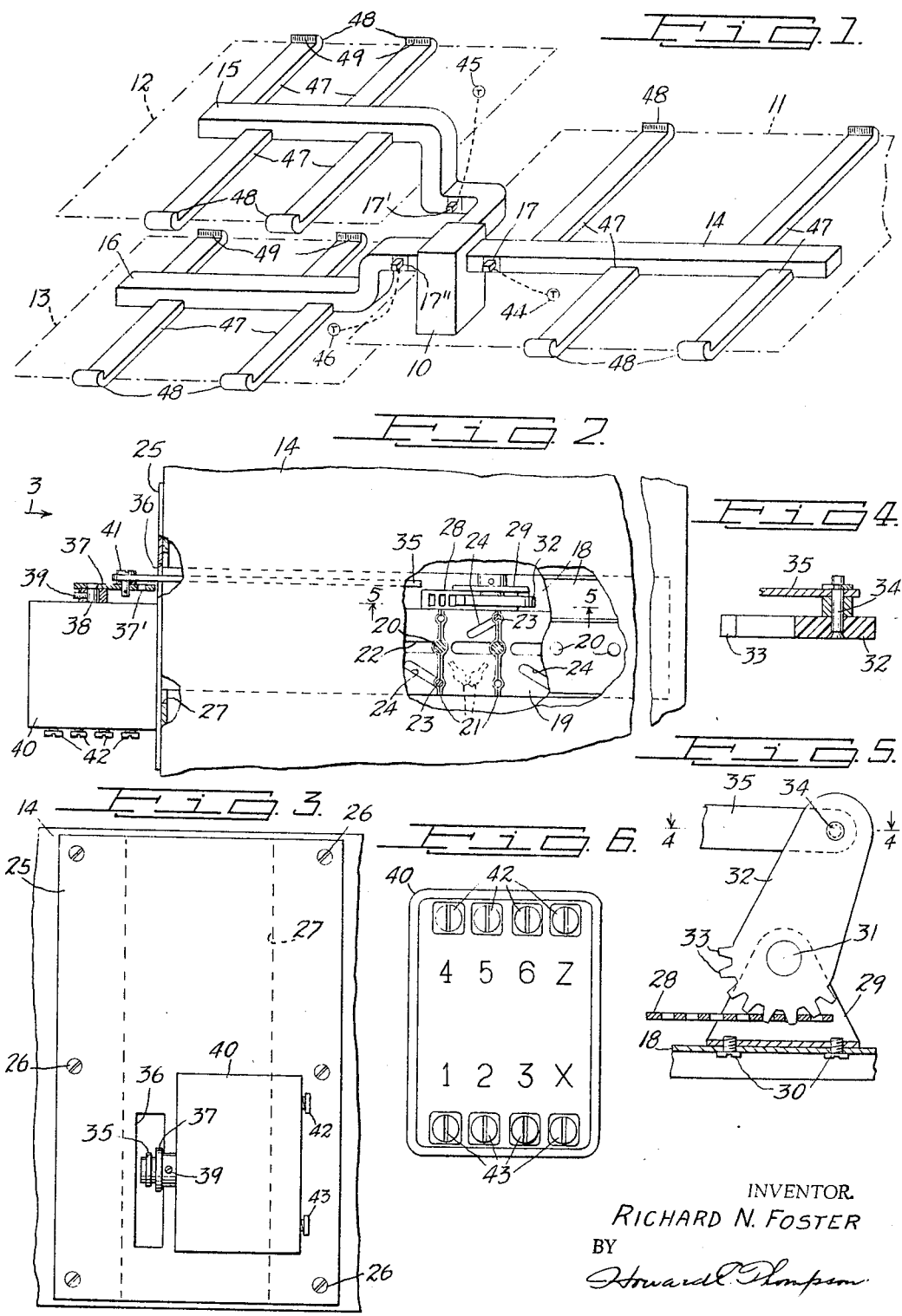

3,282,504
ZONE CONTROL AIR VALVE DAMPER FOR HEATING OR COOLING SYSTEMS
Richard N. Foster, 160 Rock Hill Road, Clifton, N.J.
Filed Nov. 12, 1964, Ser. No. 410,555
17 Claims. (Cl. 236—1)

This application constitutes a continuation-in-part of an application filed by me April 23, 1963, Serial Number 275,028, issued May 17, 1966 in Letters Patent Number 3,251,548.

This invention relates to heating and cooling systems having primary ducts extending from a source of heat or cold air supply to various rooms or sections having branches extending from the primary ducts in the rooms or sections with air valve controls at terminal ends of said branches. More particularly, the invention deals with an automatic air valve damper arranged in each of the primary ducts in providing zone control of the respective rooms or sections to be heated or cooled.

Still more particularly, the invention deals with a zone control air valve damper of such construction to facilitate simple installation in the primary ducts of a system and including an actuator having a simple drive for movement of the louvers of the air valve damper into open and closed positions.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic perspective view illustrating a simple system with primary ducts extending from a source of supply to various rooms or sections diagrammatically outlined by dot-dash lines, the various details of the system being omitted for sake of clarity.

FIG. 2 is a plan view of a primary duct diagrammatically showing one of my improved air valve dampers mounted in connection therewith, with parts of the construction broken away and parts shown in section, the louvers of the damper being shown in full lines in open position and the closed position of a pair of adjacent louvers being indicated, in part, in dotted lines.

FIG. 3 is a view looking in the direction of the arrow 3 of FIG. 2.

FIG. 4 is a section on the line 4—4 of FIG. 5, omitting most of the background showing.

FIG. 5 is an enlarged section on the line 5—5 of FIG. 2.

FIG. 6 is a detached side view of the actuator shown in FIGS. 2 and 3 on an enlarged scale.

FIG. 7 is a view similar to FIG. 1 showing a modified system; and

FIG. 8 is a diagrammatic perspective view of a modified air valve damper.

In the application heretofore noted, the structural details and wiring diagram of the air valves of a system of the kind under consideration are disclosed and, for this reason, no detail showing of the air valves in the separate rooms or sections of FIG. 1 of the drawing is illustrated.

Considering FIG. 1 of the drawing, 10 diagrammatically illustrates a source of hot or cool air supply for servicing three sections of a building, diagrammatically illustrated by the dot-dash line showing at 11, 12 and 13. These sections could constitute one room or several rooms in each section, particularly if the system is installed in a private home.

By way of illustrating one adaptation and use of my invention, the system is controlled by three similar zone control automatically actuated air valve dampers 17, 17′, 17″ in the primary ducts 14, 15 and 16, respectively. As all of these dampers are of the same construction, the brief description of one will apply to all and, in FIGS. 2 to 6, inclusive, the structure of a damper 17 is illustrated.

The air valve damper 17 comprises a substantially oblong rectangular casing 18. On the inner surface of the bottom wall is arranged a slide 19. Mounted in the top and bottom walls and extending between these walls are spaced rods 20 to which are secured louvers 21. The lower ends of the rods 20 operate in elongated apertures 22 centrally of the slides; whereas, alternate louvers have pins mounted in opposed edges thereof, as at 23, and these pins operate in angular apertures 24 at sides of the slide 19, as diagrammatically illustrated, in part, in FIG. 2 of the drawing. It will be understood that the louver structure extends the full length of the casing 18, so that the opening in the casing controlled by the louvers can be completely closed when the louvers 21 are in closed position, as indicated, in part, in dotted lines in FIG. 2. The full line showing of the louvers in FIG. 2 illustrates the fully opened position thereof. Louver casings of the type and kind briefly described are old and well-known in the art and are here illustrated in showing one adaptation of the invention.

Welded or otherwise secured to one end of the casing 18 is a large oblong rectangular mounting plate 25 fixed to the duct 14 by screws 26, as indicated in FIG. 3 of the drawing. In mounting the zone control damper unit in connection with the duct, all that is necessary is to form an opening 27 in the duct where it is desired to locate the unit, the opening extending between top and bottom walls of the duct, as indicated by the dot-dash showing in FIG. 3. This opening is adapted to receive the casing 18, as well as other parts of the unit assemblage later described. Welded or otherwise secured to one side of the slide 19 is a sheet metal rack 28 and fixed to the casing 18, adjacent the rack 28, is a bearing bracket 29, the bottom plate of which is secured to 18, as indicated at 30 in FIG. 5 of the drawing.

The upper contracted end of the bracket 29 supports a pivot pin 31, upon which is mounted a lever 32 having a gear segment face 33 to operatively engage the rack 28, as diagrammatically seen in FIG. 5 of the drawing. Pivoted to the free end of the lever 32, as at 34 in FIG. 5, is a drive link 35. This link extends through the aperture 27 in the duct 14 and through an elongated aperture 36 in the plate 25, note FIG. 3, and is adjustably coupled with an operating crank 37 fixed to the shaft 38 as by a set screw 39. The shaft 38 is the shaft of the motor of an actuator 40.

At this time, it is pointed out that the actuator 40 is of the same general structure as the actuator illustrated in the prior application hereinbefore identified and, for this reason, no specific showing of the motor or the wafer switch mechanism employed in the actuator is made.

The pin 41 coupling the link 35 with the crank 37 is shown in one of two apertures in the crank, the other aperture of the crank being shown at 37′. It will be understood that several adjustments can be provided, as to control the drive of the link transmitted to the lever 32 in regulating the feed of the slide 19 in movement of the louvers 21 from open to closed positions in each half revolution of the shaft 38.

Considering FIG. 4 of the drawing, it will be apparent that the lever 32 has been indicated as formed preferably of plastic material, thereby simplifying the production of the gear segment lever of the type and kind under consideration.

The actuator has, at one side thereof, two groups of four terminals. An upper group 42 and a lower group 43 are illustrated in FIG. 6 of the drawing, these groups having numbers or characters identifying the same to simplify wiring in the complete system. Part of the terminals are coupled with thermostats 44, 45 and 46, diagrammatically illustrated in FIG. 1 of the drawing by the circles with the letter T therein. The circuit wires extending to the respective thermostats from each of the units 17 are indicated by dotted lines.

Extending from opposed sides of each of the primary ducts 14, 15 and 16 are branch ducts, all of which are identified by the reference character 47. These lead to various walls of a section or to different rooms in a section, as will be apparent, and at terminal ends 48 of the branch ducts 47 are dampers, as at 49.

In the above described operation of the lever 32, it will be apparent from the positions of this lever, as shown in FIGS. 2 and 5 that, in operation of the motor shaft 38, the slide 19, including the rack 28, will move from left to right, in which operation the pins 20 move through the elongated apertures 22 and the pins 23 of the louvers 21 operate in the apertures 24 of the slide 19 in movement of the louvers into the closed position, as indicated, in part, in dotted lines in FIG. 2. Action of the slide swings the louvers on their pivots 20, as will be apparent. In the reverse drive or, in other words, in again moving the louvers 21 into open position, the slide 19 is moved from a right to left direction, returning the louvers to the fully open position, as indicated in full lines in FIG. 2 of the drawing.

With a system as disclosed in FIGS. 1 to 6, it will be apparent that a definite zone control is provided to care for primary supply of hot or cold air to the respective sections 11, 12 and 13. In many instances and particularly in a home, it is desirable to direct the source of service supply to specific rooms or sections and, in some instances, other zone control dampers can be employed in the system in control of rooms or other sections or areas.

The unit 17 is simple and economical in construction and can be economically installed even in an old system by simply forming the opening 27 in an existing duct. Further, the actuation of the louvers of the unit is simply and economically cared for by direct operation of the slide operating lever through the crank of the actuator 40 of each unit.

By control of the temperature requirements in the various sections or rooms through the medium of the thermostats 44, 45 and 46, the demands governed by setting of these thermostats can be fulfilled through automatic actuation of the louvers in the zone control units of the respective sections, the thermostat 44 controlling 17, 45 controlling 17′ and 46 controlling 17″.

In FIG. 7 of the drawing, I have shown a modified form of system, in which figure 10′ diagrammatically illustrates a source of hot or cold air supply for servicing three sections of a building, these sections being diagrammatically illustrated by the dot-dash lines 11′, 12′ and 13′. The section 11′ is divided by dotted lines into a large living room area 50 and a kitchen area 51. Extending into the section 11′ is a primary duct 14′, having branches, as at 47′, similar to the showing in FIG. 1, three of these branches being arranged in the area 50 and having, at their ends, dampers 49′. The control to the area 50 is by a zone control automatic air valve damper 52, similar to the damper 17 of FIG. 1. However, the branch 47′ extending into the area 51 has, at its end, an air valve damper 53 of the type and kind disclosed in the application herein before identified. Both dampers 52 and 53 are controlled by thermostats in each of the areas, as diagrammatically illustrated by the T in a circle and the dotted lines extending to the respective dampers.

Extending into the section 12′ is a primary duct 15′, having branches 47′ extending to three bedroom areas 54, 55 and 56, each of which is controlled by an air valve damper, as at 57, 58 and 59, respectively, again similar to the damper 53 and also having the thermostat controls, as diagrammatically illustrated. Two of the branch ducts 47′ extending from the duct 15′ are directed to two bathroom or similar areas 60, 61 controlled by ordinary dampers 49′, similar to these dampers in the area 50.

The section 13′ may comprise a family room or the like, into which a primary duct 16′ extends. The duct 16′, instead of having branches, has mounted in the undersurface thereof an automatically actuated air valve damper 62, the duct 16′ being preferably located in a ceiling, so that the damper 62 will direct air conditioning air downwardly into the section 13′ or at least a family room area in such section.

The air valve damper 62 is diagrammatically illustrated in FIG. 8 of the drawing and is similar in all respects to the air valve damper 17 shown in more detail in FIGS. 2, 4 and 5 of the drawing, the damper 62 differing from the damper 17 primarily in the mounting of the actuator 40′ and the type of mounting plate 25′ employed. The actuator 40′ is mounted on the rectangular casing 18′ through the medium of a bracket plate, as diagrammatically seen at 63 in FIG. 8. The casing 18′ supports louvers 21′, similar to the louvers 21, and these louvers are actuated by means, similar to that shown in FIGS. 2, 3, 4 and 5 of the drawing and part of this means is identified as the lever 32′ and the link 35′.

The mounting plate 25′ is rectangular in form. In other words, the plate has a large rectangular opening 64, as illustrated, in part, in the broken away portion of FIG. 8, this opening registering with the casing 18′ in providing free flow of air through the damper 62 as and when the louvers 21′ are in open position. In the diagrammatic showing of FIG. 8 of the drawing, the louvers are illustrated in their closed position.

With the system as diagrammatically seen in FIG. 7 of the drawing, only one of the zone control automatically actuated air valve dampers, similar to the dampers 17, 17′, 17″, is employed, as at 52, which controls the large living room area 50. In other words, dampers 17′, 17″, as shown in FIG. 1, are eliminated and independent controls are provided, as at 57, 58 and 59 in the section 12′, as well as a control 53 for the area 51 and the modified damper 62, as shown in FIG. 8, is employed to control the section 13′ or at least a family room area in such section, the damper 62 having a thermostatic control for the area, as indicated by the diagrammatic showing of the T in a circle extends to the damper 62.

With a structure as outlined in FIG. 7 of the drawing, definite controls can be provided as and when desired for each of the areas by the setting of the thermostats controlling the several areas in regulating the supply of hot or cold air to the respective areas in the operation of the system.

Having fully described my invention, what I claim as new and desire to secure by Letters Patent is:

1. In an air conditioning system employing a source of supply and primary air ducts leading from said source of supply, each of said primary ducts extending to independent sections and said primary ducts in the respective sections having supplemental ducts branching therefrom, a zone control unit for mounting in at least part of the primary ducts of the system, said unit comprising a casing arranged in a duct, the casing supporting a plurality of louvers in the duct, a plate on the casing for mounting the unit upon a wall of the duct, said wall of the duct being apertured for reception of the casing of said unit, means supported on the casing and in operative engagement with the louvers for movement of the louvers of the casing into open and closed positions, an actuator mounted on said unit, the actuator including a projecting motor driven shaft, drive means on said shaft in operative engagement with said first named means for movement of the louvers into open and closed positions, the actuator having a plurality of terminal posts, with which circuit wires are coupled controlling operation of the actuator, and one of said controls including a thermostat positioned in the area governed by said unit.

2. A structure as defined in claim 1, wherein the means for actuating the louvers comprises a slide mounted in said casing, and a drive for moving the slide in both directions in the casing.

3. A structure as defined in claim 2, wherein said drive comprises a rack on the slide, and a gear segement lever operatively engaging said rack.

4. A structure as defined in claim 3, wherein said drive means comprises a crank on the motor shaft, and a link coupling said crank with said lever.

5. A structure as defined in claim 4, wherein said link has adjustable couplings with said crank.

6. A structure as defined in claim 4, wherein said link operates in the aperture of said duct and in an aperture provided in said plate.

7. A structure as defined in claim 3, wherein means is provided forming a pivotal support for said gear segment lever, and said last named means is fixed to the casing adjacent said rack.

8. In an air conditioning system of the character defined, an air control unit comprising a casing having spaced louvers therein for control of passage of air therethrough, a drive member in operative engagement with the louvers for movement of said louvers into open and closed positions, the casing having a mounting plate for support of the casing in an air circulating duct of a system, an actuator supported on said unit, said actuator having a motor driven shaft projecting through a wall thereof, a crank fixed to said shaft, a link coupled with the crank and with said drive member for movement of the louvers into open and closed positions, and said actuator including means controlling operation of said crank and movement imparted to said louvers.

9. A unit as defined in claim 8, wherein said unit comprises a complete assemblage attachable and detachable with respect to a duct, and means for securing the mounting plate to the duct.

10. A unit as defined in claim 8, wherein said drive member comprises a gear segment lever operatively engaging a rack, and said rack including means operatively engaging all of the louvers in movement of the louvers into open and closed positions.

11. In an air conditioning system employing a source of air supply with primary air ducts extending from said source of supply to idependent areas, each primary duct having branch ducts arranged in each area with dampers at terminal ends of predetermined branch ducts, means comprising a thermostatically controlled air valve damper unit mounted in at least one of said primary ducts for control of air supply from the source to said primary duct and its branches in independent control of the areas in which said branches are arranged, said unit including a casing supporting louvers, said casing having a mounting plate for support of the casing in said one primary duct, an actuator mounted on said unit, and means placing said actuator in operative engagement with said louvers in controlling circulation of air through said one primary duct.

12. In an air conditioning system employing a source of supply and primary ducts leading from said source of supply, each of said primary ducts extending to independent sections, said primary ducts in at least part of the sections having supplemental ducts extending therefrom into divided areas in said sections, a zone control unit mounted in one primary duct and controlling branches extending to one area in the section in which said primary duct extends, said unit comprising a casing, the casing supporting a plurality of louvers spaced transversely of the duct, a plate on the casing for mounting the unit upon a wall of the duct, said wall of the duct being apertured for reception of the casing of said unit, means supported on the casing and in operative engagement with the louvers for movement of the louvers of the casing into open and closed positions, an actuator mounted on said unit, the actuator including a projecting motor driven shaft, drive means on said shaft in operative engagement with said first named means for movement of the louvers into open and closed positions, the actuator having a plurality of terminal posts, with which circuit wires are coupled controlling operation of the actuator, one of said controls including a thermostat positioned in the area governed by said unit, supplemental ducts of another primary duct extending to a plurality of areas in another section of the system, and at least part of said supplemental ducts controlling predetermined areas including thermostatically controlled automatic air valve dampers.

13. A structure as defined in claim 12, wherein the system includes a primary duct extending to the ceiling portion of an area in another section of the system, and said last named primary duct including a thermostatically controlled automatically actuated air valve damper mounted in the lower surface of said last named primary duct.

14. A structure as defined in claim 13, wherein said last named damper includes an actuator arranged within said last named duct.

15. In an air conditioning system of the character defined, an air control unit comprising a casing having spaced louvers therein for control of passage of air therethrough, a drive member in operative engagement with said louvers for movement of said louvers into open and closed positions, the casing having a mounting plate apertured to register with the casing for passage of air through said casing and plate, said plate providing means for mounting the unit in connection with an air circulating duct of a system, an actuator supported on the casing of said unit and adapted to be arranged within the duct in connection with which the unit is mounted, said actuator having a motor driven shaft projecting through a wall thereof, a crank fixed to said shaft, a link coupled with the crank and with said drive member for movement of the louvers into open and closed positions, and said actuator including means controlling operation of said crank and movement imparted to said louvers.

16. In an air conditioning system employing a source of air supply, with primary air ducts extending from said source of supply to independent areas, at least part of said primary ducts having branch ducts arranged in predetermined areas with thermostatically controlled air valve dampers in said branch ducts, means comprising a thermostatically controlled air valve damper unit mounted in at least one of said primary ducts for controlling air supply from the source to said last named primary duct and its branches in independent control of the areas in which said branches are arranged, said unit including a casing supporting louvers, said casing having a mounting plate for support of the casing in said one primary duct, an actuator mounted on said unit, and means placing said actuator in operative engagement with said louvers in controlling circulation of air through said one primary duct.

17. In systems as defined in claim 16, wherein another primary duct extends from the source of supply to the ceiling of another area, and said last named duct including a thermostatically controlled air valve damper mounted therein and exposed through a lower surface of said duct.

References Cited by the Examiner
UNITED STATES PATENTS

| | | | |
|---|---|---|---|
| 2,188,775 | 1/1940 | Locke | 236—1 |
| 2,407,284 | 9/1946 | Kennedy | 98—40 |
| 2,628,032 | 2/1953 | Copping | 236—1 |
| 2,663,498 | 12/1953 | Copping | 236—10 X |
| 3,034,531 | 5/1962 | Kennedy | 98—41 X |

EDWARD J. MICHAEL, *Primary Examiner.*